(12) United States Patent
Chuang et al.

(10) Patent No.: US 7,246,708 B2
(45) Date of Patent: Jul. 24, 2007

(54) ADJUSTABLE CASSETTE FOR SUBSTRATES

(75) Inventors: ChengDoul Chuang, Miao-Li (TW);
Chien-Sung Deng, Miao-Li (TW);
Hung-Wen Yang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 341 days.

(21) Appl. No.: 10/923,189

(22) Filed: Aug. 20, 2004

(65) Prior Publication Data

US 2005/0041325 A1 Feb. 24, 2005

(30) Foreign Application Priority Data

Aug. 20, 2003 (TW) .............................. 92122809 A

(51) Int. Cl.
*A47G 19/08* (2006.01)
(52) U.S. Cl. .................................. 211/41.18
(58) Field of Classification Search ............. 211/41.14, 211/41.18, 43, 175, 41.1, 59.4; 361/796; 206/710
See application file for complete search history.

(56) References Cited

U.S. PATENT DOCUMENTS

| 4,191,295 | A | * | 3/1980 | Tams, III | .................... | 211/41.1 |
| 5,890,597 | A | * | 4/1999 | Fan et al. | .................... | 206/710 |
| 5,890,598 | A | | 4/1999 | Hayashida et al. | | |
| 5,960,959 | A | * | 10/1999 | Wu et al. | .................... | 206/710 |
| 6,074,154 | A | | 6/2000 | Ueda et al. | | |
| 6,145,673 | A | * | 11/2000 | Burrows et al. | ......... | 211/41.18 |
| 6,273,275 | B1 | | 8/2001 | Kim et al. | | |
| 6,523,701 | B1 | | 2/2003 | Yoshida et al. | | |
| 6,749,072 | B2 | * | 6/2004 | Matsuda et al. | ......... | 211/41.17 |
| 7,032,758 | B2 | * | 4/2006 | Pai et al. | .................... | 206/710 |

* cited by examiner

*Primary Examiner*—Sarah Purol
(74) *Attorney, Agent, or Firm*—Wei Te Chung

(57) ABSTRACT

A cassette (1) for holding and transporting substrates includes a chassis (11), a pair of supporting walls (30) facing each other, a pair of first pivot elements (40), and a pair of second pivot elements (42). The first and second pivot elements are pivotally connected to the chassis and supporting walls, respectively. Each of the supporting walls includes a plurality of supporting members (301) protruding inwardly therefrom. The chassis and the supporting walls define a space for accommodating the substrates on the supporting members. A distance between the supporting walls can be easily adjusted by pivoting the pivot elements. Thus the space defined by the chassis and the supporting walls is adjusted accordingly, in order to accommodate substrates of a particular size. The cassette is adaptable for use with substrates of various sizes simply by pivoting the pivot elements.

16 Claims, 4 Drawing Sheets

ADJUSTABLE CASSETTE FOR SUBSTRATES

BACKGROUND OF THE INVENTION

1. Field of the Invention

The present invention relates to a cassette for holding and transporting a plurality of substrates, particularly substrates such as liquid crystal panels.

2. Prior Art

Nowadays, various kinds of substrates including glass substrates are extensively used in the manufacturing of LCDs (Liquid Crystal Displays), plasma displays and hybrid ICs (Integrated Circuits). In general, the substrates are loaded into a substrate cassette for storage or transportation. The cassette can conveniently hold a plurality of the substrates. This kind of means is in widespread use for carrying a plurality of substrates between fabrication stations in a factory or between factories.

A conventional cassette is shown in FIG. 4. The cassette 10 includes a top plate 2, a bottom plate 12, and two side plates 4 interconnecting the top plate 2 and the bottom plate 12. The side plates 4 have a plurality of parallel supporting members 8 protruding inwardly therefrom. The top plate 2, the bottom plate 12 and the side plates 4 cooperatively form a space 7 therebetween, for accommodating substrates inserted along the supporting members 8. The cassette 10 also includes several stopper rods 5 for retaining the substrates therein.

However a factory generally handles various sizes of substrates. When differently sized substrates need to be stored or transported, a new cassette for each size of substrate is needed. This increases the cost of storage and transportation.

Therefore, it is desired to provide a new cassette which overcomes the above-described disadvantages of conventional cassettes.

SUMMARY OF THE INVENTION

An object of the present invention is to provide a cassette for holding and transporting a plurality of differently sized substrates on different occasions.

In order to achieve the above-described object, a cassette in accordance with the present invention includes a chassis, a pair of supporting walls facing each other, a pair of first pivot elements, a pair of second pivot elements and a pair of first locating plates. The first and second pivot elements are pivotally connected to the chassis and supporting walls, respectively. Each of supporting walls includes a plurality of supporting members protruding inwardly therefrom. The first locating plates are respectively fixed to the chassis at corners thereof. Each first locating plate defines at least two locating holes therein. A part of each first pivot element is selectively located in one of the locating holes of a corresponding first locating plate. The chassis and the supporting walls define a space for accommodating the substrates on the supporting members.

The advantage of the invention is that a distance between the supporting walls can be easily adjusted by pivoting the pivot elements. Thus the space defined by the chassis and the supporting walls is adjusted accordingly, in order to accommodate substrates of a particular size. Once the pivot elements are set in position, they are kept in position by protrusive bottom ends of shafts of the pivot elements being engaged in locating holes of bottom locating plates, and latch pins of the shafts being engaged in selected latch slots of top locating plates. The cassette is adaptable for use with substrates of various sizes simply by pivoting the pivot elements.

These and other features, aspects and advantages of the present invention will become more apparent from the following detailed description and claims, and from the accompanying drawings in which:

DETAILED DESCRIPTION OF THE PRESENT INVENTION

Reference will now be made to the drawings to describe the present invention in detail.

Figure 1:
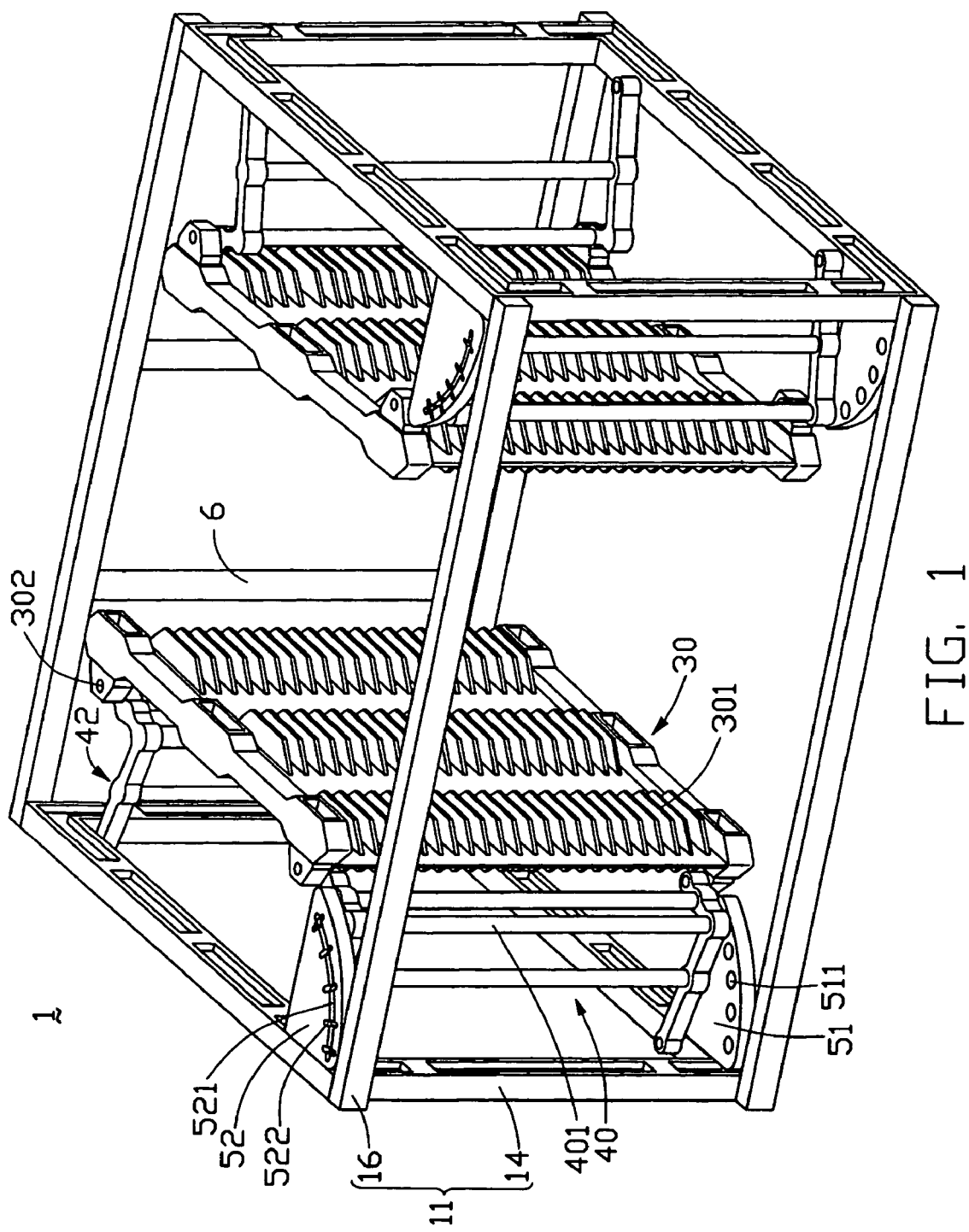
FIG. 1 is an isometric view of a cassette in accordance with a first embodiment of the present invention.
Figure 2:
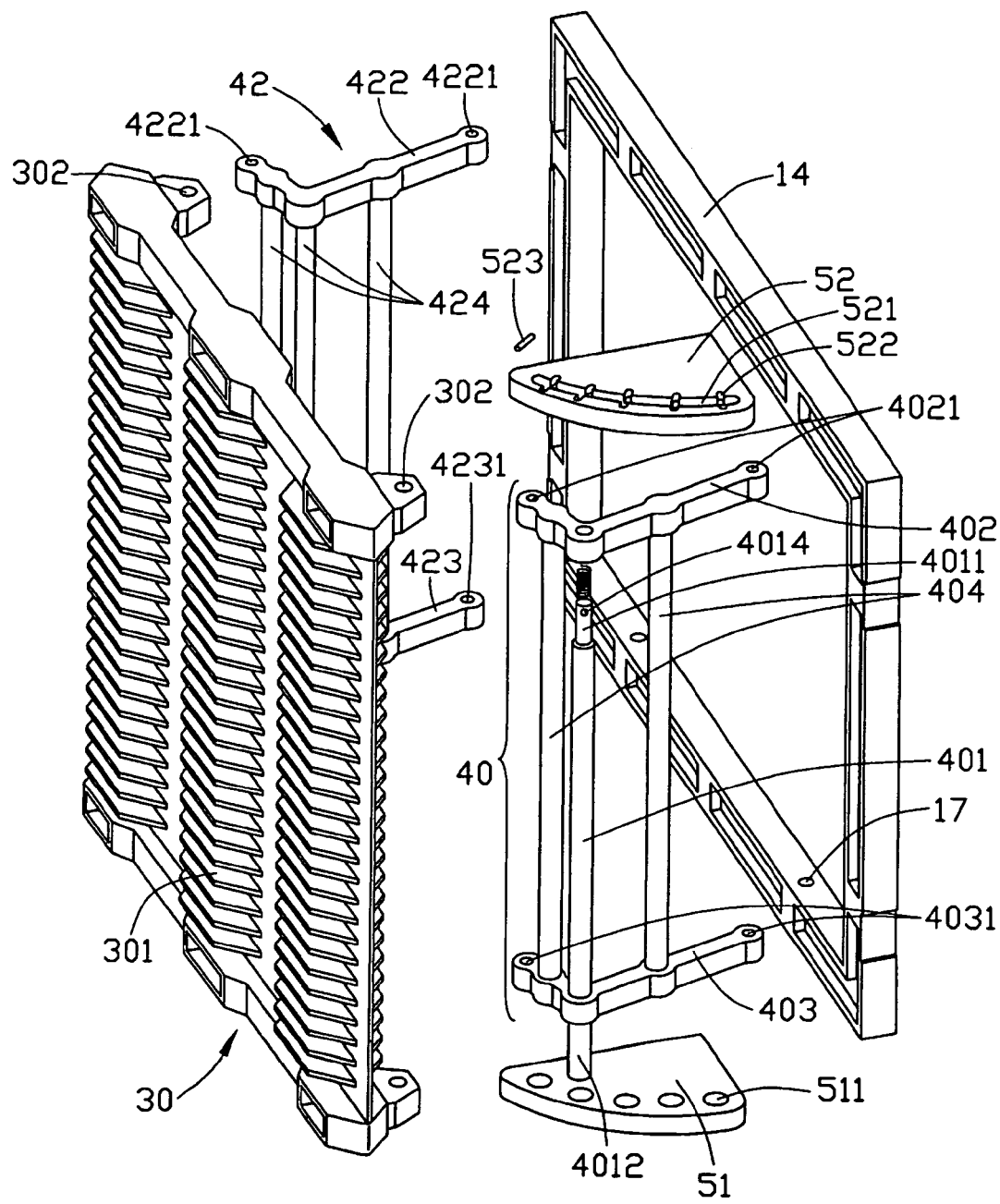
FIG. 2 is an exploded view of part of the cassette of FIG. 1, viewed from another aspect.

Referring to FIGS. 1 and 2, a cassette 1 in accordance with the first embodiment of the present invention is for holding and transporting substrates. The cassette 1 includes a chassis 11, a pair of first locating plates 51, a pair of second locating plates 52, a pair of supporting walls 30, a pair of first pivot elements 40, and a pair of second pivot elements 42.

The chassis 11 includes a pair of rectangular frames 14, a plurality of connection members 16, and one or more stop rods 6. The frames 14 are spaced opposite from each other, and are interconnected by the connection members 16. The frames 14 have a plurality of pivot holes 17 defined therein. The stop rods 6 are arranged between two of the connection members 16 at a back side of the chassis 11.

The first locating plates 51 are respectively fixed to bottom sides of the frames 14, at front corners thereof. Each of the first locating plates 51 is semi-segment shaped, and defines a plurality of locating holes 511 therein. The locating holes 511 are through holes or blind holes.

The second locating plates 52 are respectively fixed to top sides of the frames 14 at front corners thereof, being respectively opposite to the first locating plates 51. Each of the second locating plates 52 is semi-segment shaped, and defines an arcuate sliding groove 521 therein and a plurality of latch slots 522 arranged along the sliding groove 521. The latch slots 522 of the second locating plates 52 correspond to the locating holes 511 of the first locating plates 51.

The supporting walls 30 face each other across a middle of the cassette 1. Each supporting wall 30 includes a plurality of parallel supporting members 301 protruding inwardly therefrom. Each supporting wall 30 defines four pivot holes 302 in four corners thereof respectively.

Each first and second pivot element 40, 42 respectively includes a top bar 402, 422, a bottom bar 403, 423 opposite to the top bar 402, 422, and one or more connection bars 404, 424 interconnecting the top bar 402, 422 and the bottom bar 403, 423. The top bar 402, 422 and the bottom bar 403, 423 are L-shaped. The top bar 402, 422 and the bottom bar 403, 423 respectively define two pivot holes 4021, 4221 and 4031, 4231 therein. Each first pivot element 40 further includes a vertical shaft 401. The shaft 401 has a protrusive top end 4011 and a protrusive bottom end 4012. The top end 4011 has a latch hole 4014 defined therein.

The chassis 11 and the first and second supporting walls 30 define a space (not labeled) for accommodating substrates therein.

In assembly of the cassette 1, the first and second pivot elements 40, 42 are pivotally connected to the frames 14 and supporting walls 30 via the pivot holes 17, 302, 4021, 4221, 4031, 4231, respectively. The bottom end 4012 of each shalt 401 can be selectively located in one of the locating holes 511 of the corresponding first locating plate 51. The top end 4011 of each shaft 401 is located in the corresponding sliding groove 521. The top end 4011 can be selectively stationed at a corresponding latch slot 522 by way of a latch pin 523 inserted through the latch hole 4014 being engaged in the latch slot 522. When the latch pin 523 is disengaged from the latch slot 522, a corresponding spring (not labeled) around the top end 4011 must be compressed. Thus the latch pin 523 is securely engaged in the latch slot 522.

In operation, each pivot element 40, 42 can pivot about the corresponding pivot holes 17. Correspondingly, the bottom end 4012 of each shaft 401 can be selectively located in one of the locating holes 511 of the corresponding first locating plate 51. Because the supporting walls 30 are pivotally connected to the pivot elements 40, 42 via the respective pivot holes 302, the supporting walls 30 can move toward or away from the corresponding frames 14. As a result, a distance between the supporting walls 30 can be adjusted, so that said space defined by the chassis 11 and the first and second supporting walls 30 is adjusted accordingly. The stop rods 6 are used to prevent substrates from sliding out from said space.

Figure 3:
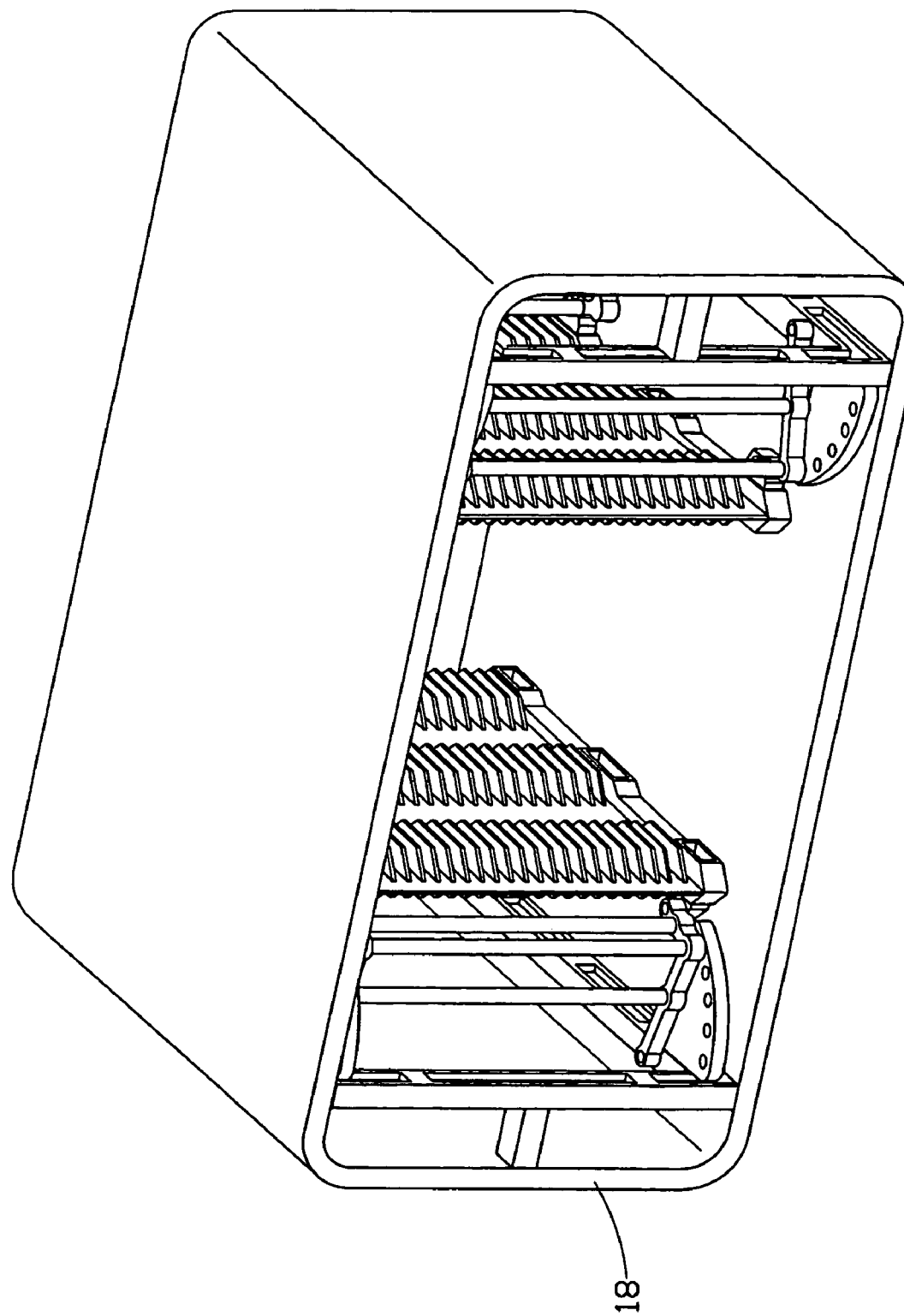
FIG. 3 is an isometric view of a cassette in accordance with a second embodiment of the present invention.
Figure 4:
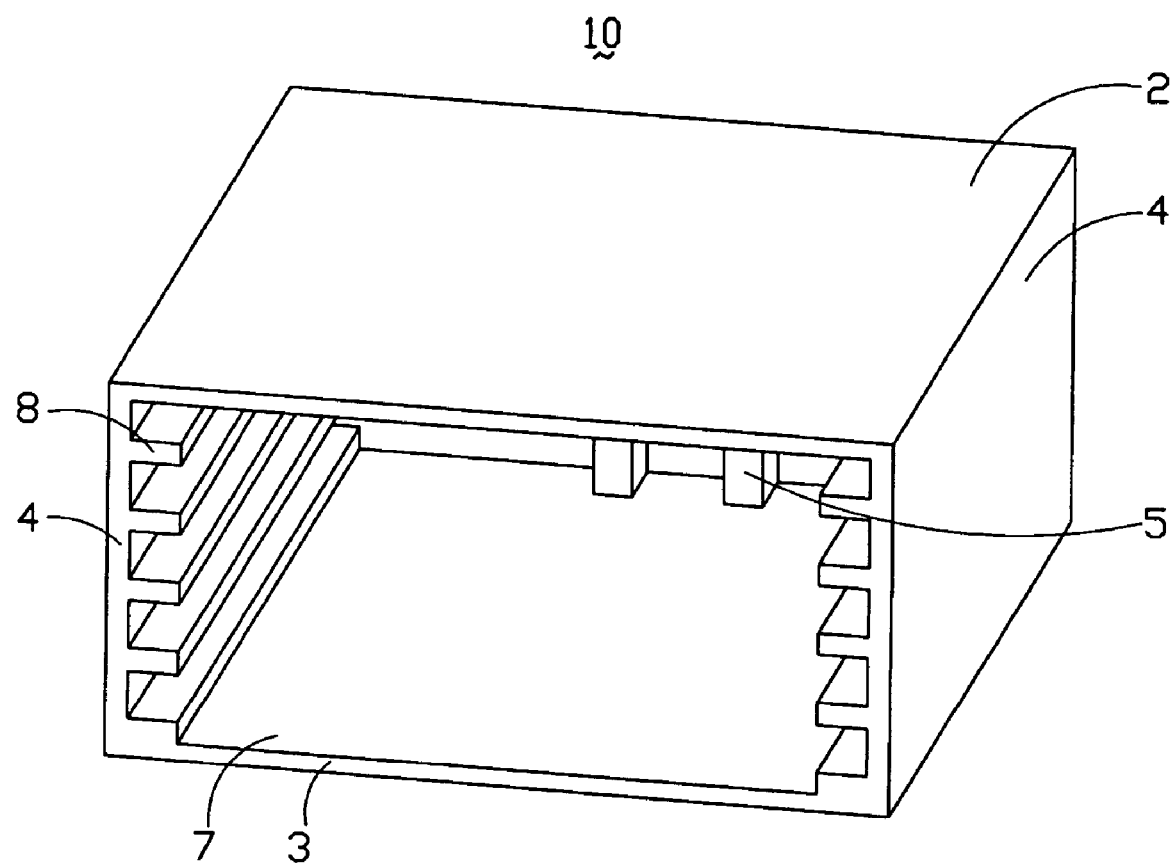
FIG. 4 is an isometric view of a conventional cassette.

Referring also to FIG. 3, in the second embodiment, a housing 18 interconnects the frames 14 instead of the connection members 16. The housing 18 has a front opening (not labeled) for the substrates to be inserted into the cassette 1.

In summary, the advantage of the described embodiments is that the distance between the supporting walls 30 can be easily adjusted by pivoting the pivot elements 40, 42. Thus said space defined by the chassis 11 and the first and second supporting walls 30 is adjusted accordingly, in order to accommodate substrates of a particular size. Once the pivot elements 40, 42 are set in position, they are kept in position by the protrusive bottom ends 4012 of the shafts 401 being engaged in the locating holes 511, and the latch pins 523 of the shafts 401 being engaged in the selected latch slots 522. The cassette 1 is adaptable for use with substrates of various sizes simply by pivoting the pivot elements 40, 42.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cassette for supporting substrates, comprising:
   a chassis;
   a pair of supporting walls facing each other, each supporting wall including a plurality of supporting member protruding inwardly therefrom;
   a pair of first pivot elements;
   a pair of second pivot elements, the first and second pivot elements being pivotally connected to the chassis and supporting walls, respectively; and
   a pair of first locating plates being respectively fixed to the chassis at corners thereof, each first locating plate defining at least two locating holes therein, a pan of each first pivot element being selectively located in one of the locating holes of a corresponding first locating plate;
   wherein the chassis and the supporting walls cooperatively define a space for accommodating the substrates on the supporting members.

2. The cassette as claimed in claim 1, further including a pair of second locating plates being respectively fixed to the chassis at corners thereof respectively opposite to the first locating plates, each of the second locating plates defining an arcuate sliding groove therein, another part of each first pivot element being located in the sliding groove of a corresponding second locating plate.

3. The cassette as claimed in claim 2, wherein the chassis comprises a pair of opposite frames, and the second locating plates are fixed to the frames at respective corners thereof.

4. The cassette as claimed in claim 1, wherein the chassis comprises a pair of opposite frames, and the first locating plates are fixed to the frames at respective corners thereof.

5. The cassette as claimed in claim 4, wherein the chassis further comprises a plurality of connection members interconnecting the frames.

6. The cassette as claimed in claim 4, wherein the chassis further comprises a bowing interconnecting the frames.

7. The cassette as claimed in claim 2, wherein each first pivot element comprises a shaft having a protrusive top end and a protrusive bottom end, the bottom end of each shaft can be selectively located in one of the locating holes of the corresponding first locating plate, and the top end of each shaft is located in the sliding groove of the corresponding second locating plate.

8. The cassette as claimed in claim 7, wherein the top end defines a latch hole therein, each of the second locating plates further defines a plurality of latch slots arranged along the sliding groove, the larch slots correspond to the locating holes of the corresponding first locating plate, and the top end can be selectively stationed at a corresponding latch slot by way of a latch pin inserted through the latch hole being engaged in the latch slot.

9. The cassette as claimed in claim 1, wherein the locating holes arc through holes.

10. The cassette as claimed in claim 1, wherein the locating holes are blind holes.

11. The cassette as claimed in claim 1, wherein each of the first locating plates is semi-segment shaped.

12. The cassette as claimed in claim 2, wherein each of the second locating plates is semi-segment shaped.

13. A cassette for supporting substrates, comprising:
    a chassis;
    a pair of supporting walls facing each other, and including two groups of plurality of supporting members protruding inwardly therefrom to face each other;
    first and second rotatable elements pivotally mounted to front and rear sections of at least one side frame of the chassis; and
    free end sections of said first and second rotatable elements being pivotally mounted to front and rear end sections of one of said supporting walls;
    wherein via rotation of said first and second rotatable elements, said one of the supporting walls is moveable with regard to the other with different distance therebetween in a lateral direction which is perpendicular to a vertical direction along which rotation axes of said rotatable elements extend.

14. The cassette as claimed in claim 13, wherein the supporting members of said pair of supporting walls commonly define a plurality of receiving channels into which the substrates are insertably received along a front-to-back direction perpendicular to both said lateral direction and said vertical direction.

15. A cassette for supporting substrates, comprising:
a chassis having a side frame defining a vertical plane in a front-to-back direction;
a rotatable structure disposed upon said side frame, said rotatable structure defining a supporting wall moveable relative to the side frame in a parallel manner but with different distance therebetween in a lateral direction perpendicular to said front-to-back direction; and
a plurality of supporting members extending on the supporting wall opposite to and away from said side frame; wherein
said cassette defines a front opening allowing said substrates to be insertably received in channels defined by said supporting members in said front-to-back direction.

16. The cassette as claimed in claim 15, wherein said structure is of a four-bar-linkage type.

* * * * *